Figure 5:
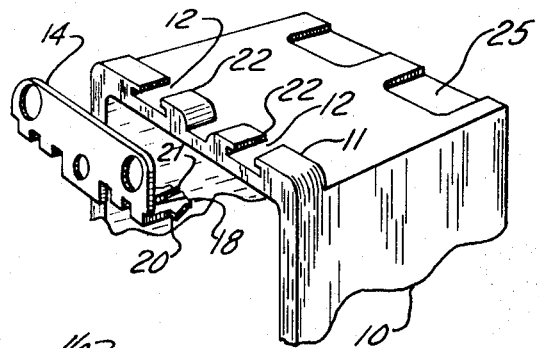

United States Patent [11] 3,575,313

[72] Inventors Robert S. Trachtenberg
 Pittsburgh;
 Julius Earl Kreuzer, Sewickley, Pa.
[21] Appl. No. 823,830
[22] Filed May 12, 1969
[45] Patented Apr. 20, 1971
[73] Assignee Midland - Ross Corporation
 Cleveland, Ohio

[54] MOUNTING MEANS FOR PLASTIC OUTLET BOXES
 3 Claims, 5 Drawing Figs.
[52] U.S. Cl. ..................................................... 220/3.3, 174/58
[51] Int. Cl. ................................................ H02g 3/08
[50] Field of Search .......................................... 220/3.3, 3.5, 3.9, 3.92, 3.4; 174/48, 49, 53, 58; 248/27, (O.B.D.)

[56] References Cited
UNITED STATES PATENTS
2,374,622 4/1945 Rugg ............................ (220/3.9UX)
3,392,943 7/1968 Baxter ........................... 248/27
3,402,954 9/1968 Simon ............................ 248/27X Primary Examiner—Joseph R. Leclair
Assistant Examiner—James R. Garrett
Attorneys—Thomas S. Mayner and Irvin L. Groh ABSTRACT: A plastic box, when molded, is provided with end extensions adapted to receive metal mounting elements. The metal mounts permit positive and repetitive use of fastening means, including self-threading screws, for the support of a receptacle and substantial flush mounting of the box, especially in thin wall construction.

PATENTED APR 20 1971    3,575,313

INVENTORS
ROBERT S. TRACHTENBERG
JULIUS EARL KREUZER
BY Thomas A. Mayner
ATTORNEY

MOUNTING MEANS FOR PLASTIC OUTLET BOXES

This invention relates to the support, or a mounting means, for plastic outlet boxes and a receptacle therein in thin wall construction. More specifically, the invention is directed to metal mounting ears which provide adaptability, strength; permits removal for replacement of receptacles of plastic boxes and their flush mounting in thin wall construction, as in mobile homes lacking normal studding in their structure.

In thin wall construction where plywood is the wall material and where plastic outlet boxes are increasingly used, the thin wall construction and the lack of supporting studding necessitates the attachment of the boxes to and in the wall itself. The lack of wall depth in plywood construction of mobile homes presents the problem of providing for a rigid support of the outlet boxes, and of the receptacle itself in them as well as total within-the-wall placement of the box itself. Where the entire outlet box is molded including mounting ears or extensions there is the need for added thickness to provide strength and this has the unwanted characteristic of a protruding face of the box into the room and the not infrequent occurrence of ear breakage during installation, and of "stripping" of internal threads securing the receptacle where screws are used. As a result of the aforesaid difficulties some boxes are provided with metal mounts, however, none have the provision of a metal base to which the receptacle itself may be secured. A metal mount draws the box almost flush with the wall surface, and it provides for a positive receptacle support. It also permits a drawing up of the cover plate thus presenting a flush mounted unit.

Advantageously, the mounting elements are formed separately for insertion into reinforced plastic slots formed integrally with the outlet box. The mounting elements, or mounts, are preferably of metal such as soft sheet steel or its equivalent so that self-threading screws can be used and still provide rigidity and strength. The mounts are made with the standard side holes for accepting wood screws and also with a hole midway for accepting a metal screw, as a self-threading one, for positioning, securing, and supporting the receptacle in the plastic box. The mount may also be supplied with the center hole tapped to accept the standard receptacle machine screw. The mounts are insertable into slots provided for them at each box end.

Figure 1:
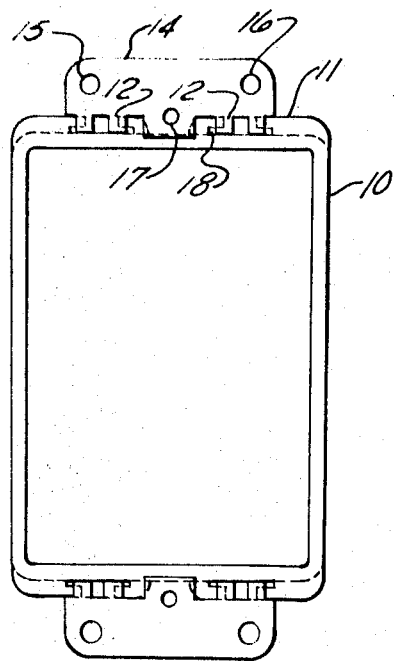
Figure 2:
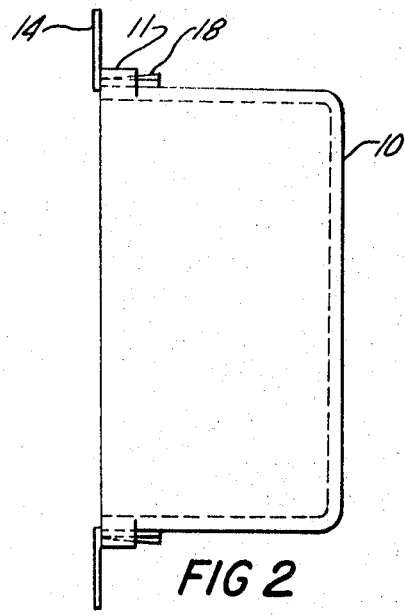
Figure 3:
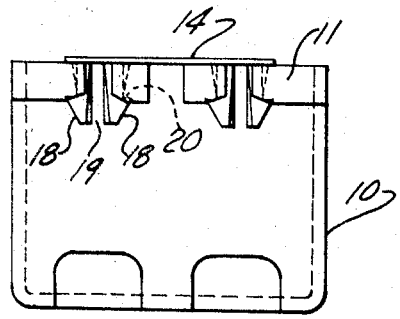
Figure 4:
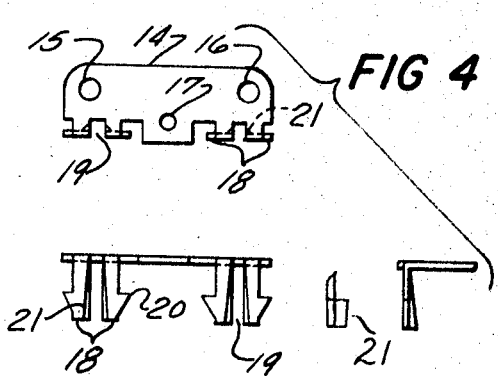

The invention and its advantages will now be described in detail in the following specification and drawing, where:

FIG. 1 represents a plan view or face of the box assembly;
FIG. 2 represents a side view of the box assembly;
FIG. 3 shows the metal mounts in box supporting position;
FIG. 4 is a series of views directed to the metal mount; and
FIG. 5 is a split perspective showing an assembly procedure.

Referring to the drawing the outlet box 10 is molded of plastic material with thickened and improvised ends 11. The ends are molded to include spaced slots 12, one at either side of the box center. The slots 12 may be open for ease of molding, and the formed opposing sides making flanges 22 (see FIG. 5). The plastic box 10 may be of phenolic resin or of any of the other plastics capable of being molded at a reasonable cost. The box is supported by mounts 14, having spaced and split right angle base extensions or dog legs 18, which are forced into and through the slots 12. Thus assembled, the box 10 is firmly and rigidly united and when by being drawn to the wall fastened thereto by screws or nails through provided holes 15 and 16, a neat and fairly flush mounting appearance is had.

The metal mount 14 is particularly shown in FIG. 4. Each of the right angle base extensions or dog legs 18 is itself split as indicated by the numeral 19 and the sides cut back with a taper 20. If closed the dog leg would appear as a blunt arrowhead. The space 19 diverges slightly toward the dog leg and the inner metal of each split section is turned upwardly as shown by numeral 21. The upturned portion 21 can be only as long as the length of the wedge 20. The outer taper (see FIG. 3) and the upturned portion 21 (see FIG. 2) help to firm up the secureness of the mount by locking it in the slots. Being laterally tapered, the portion 20 constricts the split legs 18, 19 when inserted into the receiving opening 12. When forced through, the legs are free to assume their normal positions forming a locking hold on the box. The width of the builtup box section 11 is such so as to allow the enlarge portion 20 of each right angle leg or extension to about protrude thus making a good and tight fit. The inner raised portions 21 on the dog legs 18, 19 also tend to, by impression on the inner surface of the flanges 22 or through their emergence, tighten the mounts 14 within the slots 12.

The mounts 14 are advantageously provided with receptacle mounting holes 17 which permit the use of self-threading metallic screws. This provision is an obvious improvement over an integrated plastic box having a plastic enlargement which is possibly prethreaded to accept standard machine thread screws. The mount may also be supplied with a tapped hole to accept a standard machine screw supplied with receptacles. Where, possible, a change in receptacles is required, repetitive removal of holding screws will quite readily strip the plastic threads, or a drawing up of the screws will do the same. In the applicants' case since the mount is of metal, stripping of threads is substantially eliminated. Certainly if the original screw fails to secure a receptacle then obviously one of the next size will. As shown in FIG. 5, the mount 14 is forced into and through the slots 12 of the box 10. Being of metal and thin, the extensions 18 are initially squeezed then expanded when forced through to thus lock. The mount 14 also permits the box 10 to be installed almost flush with the wall so that a cover over an installed receptacle makes the unit unobtrusive.

We claim:

1. Plastic outlet box mounting means, comprising in combination an elongated thickened section on each end of the box paralleling the front edge thereof, said section having a front side flush with the front face of the box and having a rearward depth substantially less than the depth of the box and terminating in a shoulder at its rear side, said section further containing a pair of spaced parallel slots extending substantially perpendicular to the front face of said box and extending through the entire depth of said section; and a metal mounting bracket for each end of said box, each of said brackets having a face portion containing mounting holes through which panel mounting means can be inserted and a pair of leg elements extending substantially perpendicularly from said face portion, the spacing between said leg elements being substantially the same as the spacing between said parallel slots, each leg element being bifurcated and longer than the depth of said slots and terminating in outwardly extending projections whereby when the leg elements are transversely pressed together and completely inserted into said slots the projections snap out to be retained by said shoulder face.

2. The combination according to claim 1 wherein said projections have a rearwardly converging taper away from said face portion to facilitate assembly of said leg elements into said slots.

3. The combination according to claim 1 wherein the face portion of said bracket has a further hole for receiving a screw to secure an electrical receptacle within said box.